United States Patent [19]

Kedge et al.

[11] Patent Number: 5,121,113
[45] Date of Patent: Jun. 9, 1992

[54] PRINTER STATUS AND CONTROL PANEL

[75] Inventors: Gregory J. Kedge; Gregory R. Huber; Michael P. Tompkins, all of Rochester, N.Y.

[73] Assignee: Eastman Kodak Company, Rochester, N.Y.

[21] Appl. No.: 502,963

[22] Filed: Apr. 2, 1990

[51] Int. Cl.[5] ............................................. G09G 3/00
[52] U.S. Cl. .................................... 340/712; 340/711; 341/23
[58] Field of Search ............... 355/133, 202, 206, 209, 355/326; 340/711, 712, 706; 341/23; 178/17.5

[56] References Cited

U.S. PATENT DOCUMENTS

| | | | |
|---|---|---|---|
| 4,390,872 | 6/1983 | Murakami et al. | 355/206 |
| 4,431,988 | 2/1984 | Molusis | 341/23 |
| 4,475,806 | 10/1984 | Daughton et al. | 355/14 R |
| 4,804,950 | 2/1989 | Moon et al. | 340/715 |
| 4,846,596 | 7/1989 | Bryant et al. | 341/23 |
| 4,885,575 | 12/1989 | Williams | 341/23 |
| 4,896,223 | 1/1990 | Todome | 340/712 |

Primary Examiner—Ulysses Weldon
Assistant Examiner—Jick Chin
Attorney, Agent, or Firm—J. Gary Mohr

[57] ABSTRACT

Status and control panel for a remotely located printer. The panel includes input keys and a display device which can display various text strings, icons, screens, and multiple screen sequences. Each display format is prestored in volatile memory in the panel and addressed by display instructions from the associated device over a serial communications line. The display formats are pre-loaded in the memory at the time the device is first powered-up. Some of the input keys on the control panel are defined by the display on the LCD. Icon description language is used to store data about standard icon images, and an interpreter on the panel is used to convert these descriptions into dot-matrix format for use by the LCD.

10 Claims, 5 Drawing Sheets

PRINTER STATUS AND CONTROL PANEL

BACKGROUND OF THE INVENTION

1. Field of the Invention

This invention relates, in general, to photocopying and, more specifically, to display and control devices for electrophotographic printers, copiers, and like devices.

2. Description of the Prior Art

Printers, copiers, and like devices or apparatus usually have some type of operator panel associated with the device. In the case of a printer remotely located from the source of the data to be printed, the panel performs the function of allowing the local operator at the printer to control certain aspects of the printer's operation and/or monitor the status of the printer's operation or condition. In such cases, the operator usually cannot make very many changes in the information printed by the printer, but may control certain printing parameters which are best observed by the local operator at the device location. These can include such parameters as activating accessory devices such as staplers, stopping the printer when a specific number of copies or output pages are produced, stopping the job if it is incorrect or if a malfunction occurs, adjusting output contrast, and restarting the printer after an empty paper supply has been replenished. Various other controls and functions are often provided.

Printer and copier devices which are designed to provide high quality, high speed, multi-mode output capabilities are, of necessity, relatively large devices. In order to convey status information and receive input instructions from the operator, hardware which is remote from the main controller board of the device is usually necessary. One of the problems with remote operator panels is the ability to communicate quickly enough with the main processor electronics section. This can be accomplished sometimes by controlling the panel over a parallel bus system or through a parallel output port. The disadvantage here is that a large number of wires is required and the susceptibility to picking up interference is sometimes a major design problem. In addition, extending the bus of a processor over a long distance to the panel requires loading, timing, and serious EMI considerations.

Although many such devices are on the market which use operator control panels, the problems of getting the information to and from a remote panel are always inherent in the design of the system. One technique used to avoid the problems of the remote panel is to make it totally self-sufficient and specifically designed for a particular class of devices. That is, let it do all of the work of processing needed to accomplish its objectives and only communicate with other devices on a limited basis. With these restrictions, the relatively small amount of communications between the panel and the main processor can be accomplished over a serial line without seriously affecting the system speed. The disadvantage is that the panel has a dedicated display and is useful for only a limited number of product configurations.

U.S. Pat. No. 4,475,806, issued on Oct. 9, 1984, discloses a copier having a display panel which is constructed in the foregoing described manner. The display panel in this patent uses a dedicated LCD display which has fixed segments which can be controlled to display certain machine or device parts or sections. Only information relating to the occurrence of a fault condition or system configuration is passed between the main processor of the copier and the processor controlling the displays on the panel. In addition, the control inputs for the copier are on another panel and are processed by the main processor rather than communicating their control requests over the communications channel between the main processor and the display panel. Although such a panel as disclosed in the referenced patent may be useful in certain applications, it does not offer the advantages provided by the universal status and control panel of the present invention.

To overcome some of the problems encountered with using status and control panels located remotely from the main device electronics, it is desirable, and an object of this invention, to provide a universal status and control panel which can quickly control and display a large variety of status information with a simple and effective interconnecting path between the devices.

SUMMARY OF THE INVENTION

There is disclosed herein a new and useful status and control panel for copiers, printers, and like devices. The panel is constructed in such a manner that it can be used universally with many different types of associated devices and still display and control specific parameters unique to each device. The panel architecture is arranged so that its versatility can be utilized efficiently and quickly by the associated device. According to a specific embodiment of the invention, the universal status and control panel includes a dot-matrix display, an array of input keys assignable and identifiable to different input selections, and electronic support hardware which services the display and input keys. The complete panel system communicates with the main intelligent processor in the associated device, which makes the decision about what is to be displayed by the panel based upon multiple inputs of device operating and status conditions. This architecture reduces the amount of information which needs to be transmitted to the status and control panel.

The status and control panel includes an LCD display which is capable of producing alphanumeric characters and icons. Soft-keys, which are definable by the LCD, are included on the panel as are fixed or dedicated keys which control various functions of the device and panel. Indicating LED's, beepers or enunciators, and an infrared beacon are also included in a specific embodiment of the invention. The images formed on the display of the LCD are activated by instruction signals from the associated device. These instruction signals indicate what is to be displayed rather than the condition of the device, whereupon the control panel would need to determine what to display. The icons, text strings, screens, and multiple screens, or cartoons, which can be displayed on the LCD are preloaded to a library memory at the panel from the associated device upon powering-up of the device. This, in effect, causes the universally adaptable panel to become a dedicated panel for the particular device to which it is connected. Some of the display images contained within the multiple screens and screen displays can be embedded with icons and text strings already defined in the library memory of the panel.

An interpreter is used on the panel to convert or translate icon description language, which is a vector form of image description, into the format needed to display the icon on the dot-matrix display of the LCD. ASCII letters and numbers are applied directly to the LCD which converts them into the required dot format. A resettable timer is used to perform a "heartbeat" function in the device whereupon it indicates to the associated device a malfunction of the CPU in the control panel if it is not reset within a certain prescribed time period on a regular and repeating basis.

In order to make a display change on the LCD, the associated device sends an instruction to the panel which includes the identity of the prestored display, and the location that the display is to be produced on the LCD if it is less than the entire screen or area of the display. For non-standard displays and displays which are infrequently used, the instructions from the associated device can contain actual data, such as an ASCII text string, to be outputted to the LCD.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Throughout the following description, similar reference characters refer to similar elements or members in all of the figures of the drawings.

Figure 1:
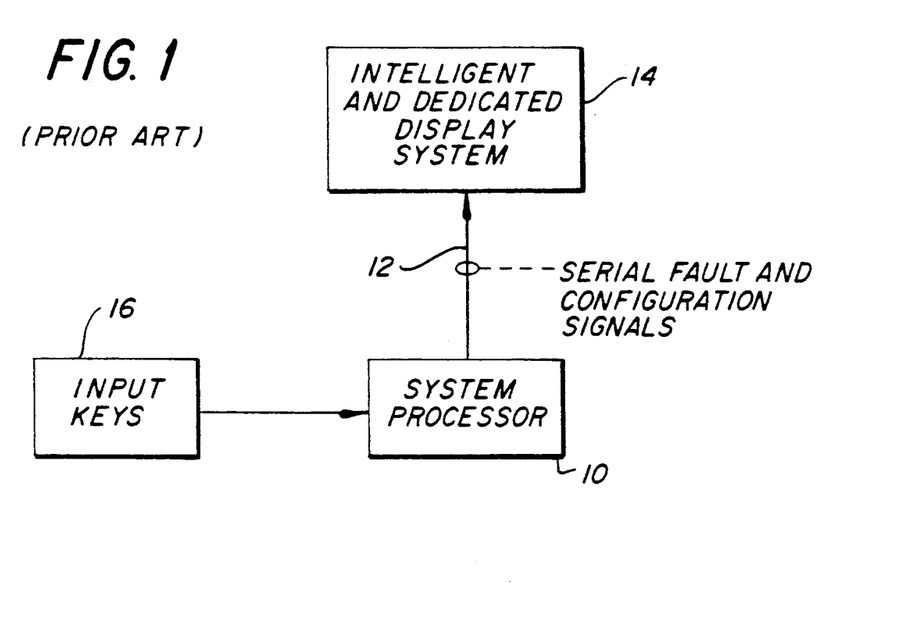
FIG. 1 is a block diagram showing the general relationship between the main system processor and other system input and display devices according to a prior art arrangement.

Referring now to the drawings, and to FIG. 1 in particular, there is shown a general block diagram of a prior art system. According to FIG. 1, the main system processor 10 is connected through a serial communications line 12 to the custom or dedicated display system 14. Input keys 16 are monitored directly by the system processor 10 to receive any commands or instructions from the local operator without using line 12. The system processor 10 monitors various functions within the system, which can be a copier or a printer, and, when a fault or other abnormal condition has been detected, this fact is transferred across the line 12 to the display system 14. In addition to fault signals, configuration signals are sent to the display system 14 by the processor 10 to inform the display system 14 of the type of apparatus the system processor is controlling.

The display system 14 includes dedicated segments on a display which can be illuminated or highlighted to indicate a particular status of the configured machine. In addition, the display system includes an intelligent processor which uses an algorithm for determining what needs to be displayed when a certain fault signal is sent from the system processor 10. The architecture shown in FIG. 1 lends itself to receiving limited and short messages from the processor 10 while still using the intelligence of the display system 14 and the small number of display elements in the system to adequately represent and convey the machine's status to the local operator. However, this type of system has the disadvantage that the display system is useful only with a small number of machine configurations and the display system is not easily used with other apparatus without changing the custom symbols on the display system and/or the intelligent algorithm which determines what to display based upon the information received from the system processor 10.

Figure 2:
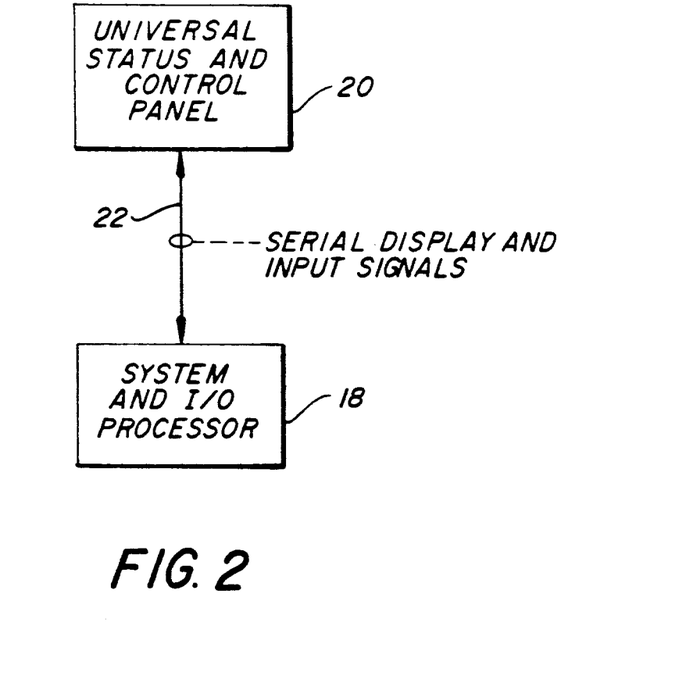
FIG. 2 is a block diagram showing the general relationship between the main system processor and the status and control panel of the present invention.

FIG. 2 is a generalized block diagram of the present invention which constrasts the present invention with that of the prior art device described in FIG. 1. According to FIG. 2, the system and input-output (I/O) processor 18 receives information representing the operation of the associated device, which can be a printer or a copier. The processor 18 processes the information and determines the nature of the information, such as a fault condition, and also determines what message and/or pictorial image should be displayed by the status and control panel 20. In other words, the processor 18 intelligently analyzes the inputs from the machine parameters and determines when a particular condition exists, what the response of the control panel will be for the observed condition, and what signals need to be transmitted across line 22 to the status and control panel 20. By processing the input parameters in the processor 18, the control panel 20 does not need to have an algorithm which determines what is to be displayed in response to the observed condition. Therefore, the status and control panel 20 shown in FIG. 2 is universally applicable to a wide variety of apparatus since the application specific algorithm or program is contained in the processor 18 and not in the control panel 20. In addition, the display panel associated with the status and control panel 20 is a universal dot-matrix type, as will be discussed later, which can be configured for a particular application or language by using the teachings of this invention which will also be described in more detail later herein. The status and control panel 20 also includes input and other output devices which have a universal application and are tailored, through controls from the processor 18, to request operator inputs specific to the equipment which the processor 18 controls. This, also, is controlled by the information transferred from the processor 18 to the control panel 20 at the appropriate times.

Figure 3:
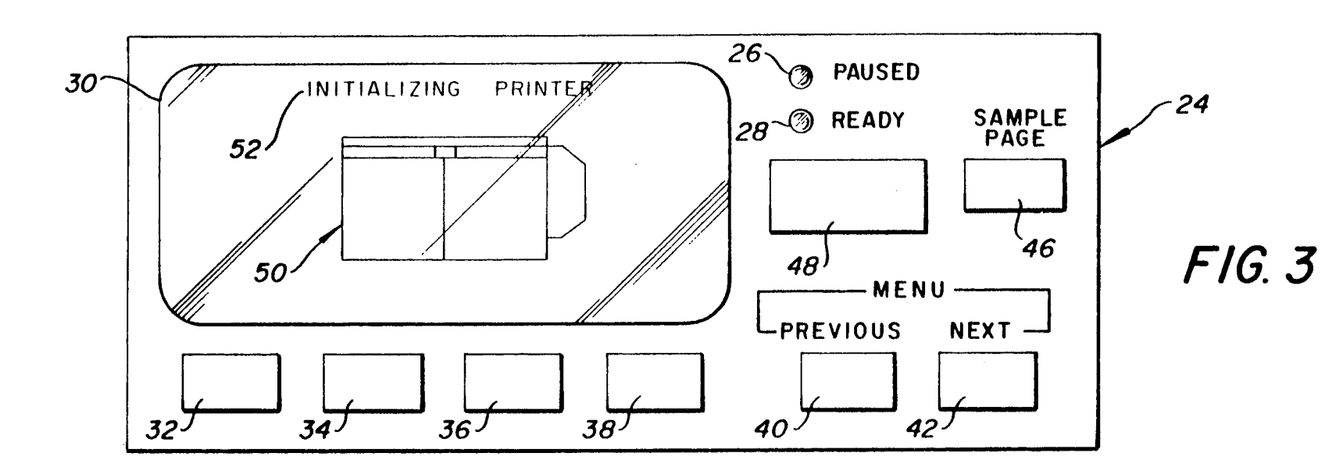
FIG. 3 is a front view of a status and control panel displaying an icon and a text string.

FIG. 3 is a front view of a status and control panel constructed according to this specific embodiment of the invention. The control panel 24 includes an electronics circuit board with the LED's 26 and 28 connected thereto, and with the dot-matrix LCD display 30 electrically connected to the board. The LCD 30 has a resolution of 64×240 dots or pixels. A commercially available display meeting these requirements is manufactured by Toshiba, and is identified as Model TLX- 711-A-102. The version illustrated in FIG. 3 with the invention uses EL back lighting.

The status and control panel 24 also includes keys or buttons 32, 34, 36, 38, 40, 42, 46 and 48. These buttons are available for access or activation by the local operator and control various functions in the panel and the associated device or apparatus. Some of the buttons have dedicated and nonvariable functions, such as buttons 40, 42, 46 and 48. Other buttons, such as buttons 32, 34, 36 and 38, have functions which depend upon the present status of the associated device. These are known as "soft-keys" because the function of the buttons or keys is determined by software in the associated apparatus. As will be described in more detail later, the LCD 30 may be controlled to indicate the function of the soft-keys so that the operator knows what the current function of each key is when it is activated.

FIG. 3 also illustrates a pictorial display occurring on the LCD 30. The icon 50 represents the outline of the printer with which the status and control panel 24 is associated. This icon is constructed on the LCD 30 by applying a specific dot-matrix pattern to the LCD 30 from the hardware and software contained in the control panel 24. As will be indicated elsewhere in this description, other icons or display pictorials can be created on the LCD 30. In addition to the icon 50, the LCD 30 also is displaying the text string 52 which indicates that the printer is in the process of initializing the necessary electronic and/or mechanical components in the machine. This type of display would normally occur at the beginning of operation of the machine, before the machine is ready to start an actual printing job.

SAMPLE PAGE key 46 is used to print one page from the printer in order for the operator to determine if any additional adjustments are needed before the complete job or run is started. Key 48 is used to toggle between the PAUSED and READY conditions of the printer. The LED's 26 and 28 indicate which condition the key 48 has selected. In the PAUSED condition, the machine will not output any printed pages. The machine is normally put in this condition when some of the variables of the process are being controlled by the operator with the various other keys on the control panel. When the condition READY is indicated, the printer is ready to begin printing the present job.

Figure 4:
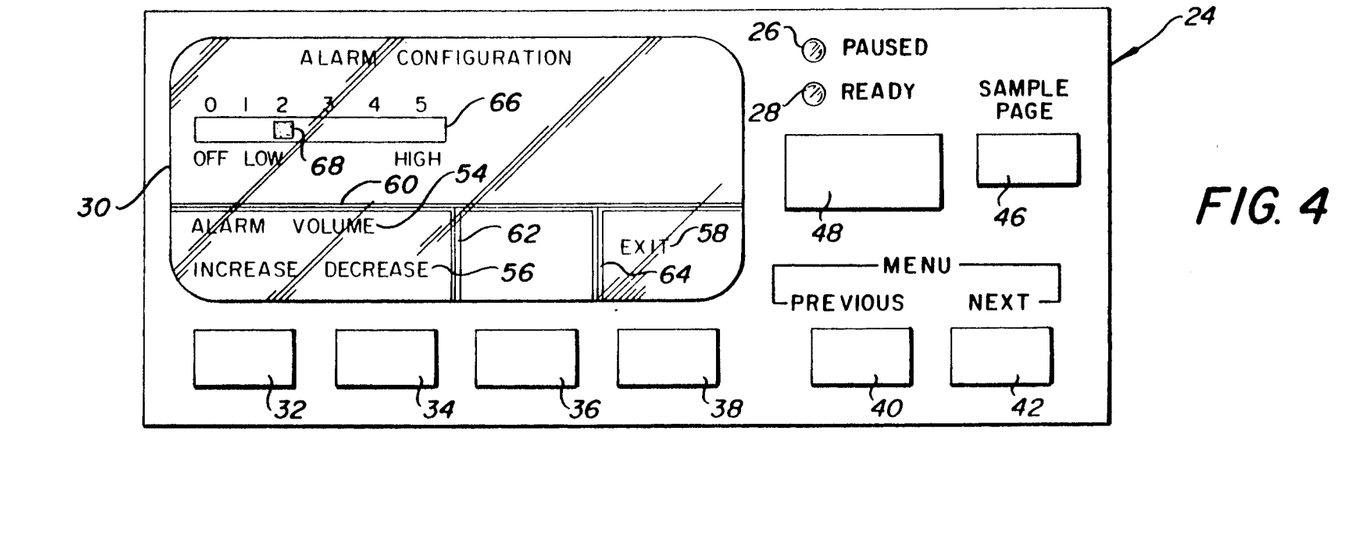
FIG. 4 is a front view of a status and control panel displaying soft-key function identifiers.

FIG. 4 is another view of the control panel 24 displaying another type of message or pictorial representation on the LCD 30. According to FIG. 4, the soft-keys 32, 34, 36 and 38 are described by the text strings 54, 56 and 58 on the LCD 30. The lines 60, 62 and 64 help to identify which text strings apply to a particular soft-key. In this specific case, keys 32 and 34 both are used to adjust the volume of an alarm in the printer, with key 32 increasing the volume and key 34 decreasing the volume. The key 36 is not used in this particular status or menu condition, and key 38 is used to exit the current menu and return to another menu, which may be a default menu indicating that the machine or printer is ready to perform the expected job. Keys 40 and 42 are used to scroll the menu, or the display on the LCD 30, between the previous and the next menus which the control panel 24 is designed to provide.

It is to be understood that the menus or screens displayed in both FIGS. 3 and 4 are only illustrations of specific menus that the panel can provide. Many other types of menus for other functions on the printer would normally be within the capabilities of the panel 24. Other menus may be concerned with the need to add toner, paper, or other consumables to the printer, the status of the job at any particular instant during the actual job production, the display of any error messages which a fault condition in the machine has necessitated, and the adjustment of the printing quality, such as the darkness or contrast of the printed page. Typical error and warning messages which can be conveyed in text strings are FUSER UNDER TEMPERATURE, MACHINE TIMING ERROR, TONER MONITOR ERROR, ENGINE PAPER JAM, COVER OPEN, and ADD TONER TO STATION 3. It is emphasized that text strings, as used in this description, include both numbers and letters such that a text string can be any combination of alphanumeric characters which are capable of being specified within the dimensions or limits of the number of characters defined by the text string.

FIG. 4 also includes the icons 66 and 68 which are displayed by the LCD 30. Icon 66 is an unfilled rectangular box, and icon 68 is a filled rectangular box. The lines 60, 62 and 64 may also be considered as icons of rectangular boxes which are filled. The display of the text strings and the icons is under the control of the main system processor contained in the associated device. In addition to displaying text strings and icons, the control panel 24 can, when instructed by the main processor, display complete screens or a synchronized multiple screen representation of the information to be conveyed to the local user. In other words, since alphanumeric characters and icons are used to construct an entire screen, or complete LCD display, the electronics which support the LCD 30 can be configured to identify the desired display by a whole screen of information. A multiple screen system, or cartoon, simply displays a series of screens, or stanzas, over a period of time to indicate movement of some or all of the elements in the screen display. For example, a cartoon or multiple screen display would be used if the icon 68 was to appear blinking on and off at the rate of one time a second. Alternating screens would be used in the multiple screen display with the only difference between the two screens being the presence or absence of the icon 68.

As will be described later herein, it is beneficial and economical to describe some displays as complete screens, complete multiple screen sequences, or just simply icons or text strings. The status of the control panel 24 maintains a library of these four possible types of displays and the identity of a particular type of display is all that is needed from the associated system processor to activate the LCD 30. When the volume is increased by pushing key 32, the icon 68 would move to the right, upscale, and eventually reach the high limit of 5. This particular type of display can be depicted by having six screens for the alarm configuration, with each screen having the box 68 positioned underneath a different alarm volume level designator. Therefore, each of the six different alarm settings can be indicated by six display screens stored in the memory of the status and control panel 24.

Figure 5:
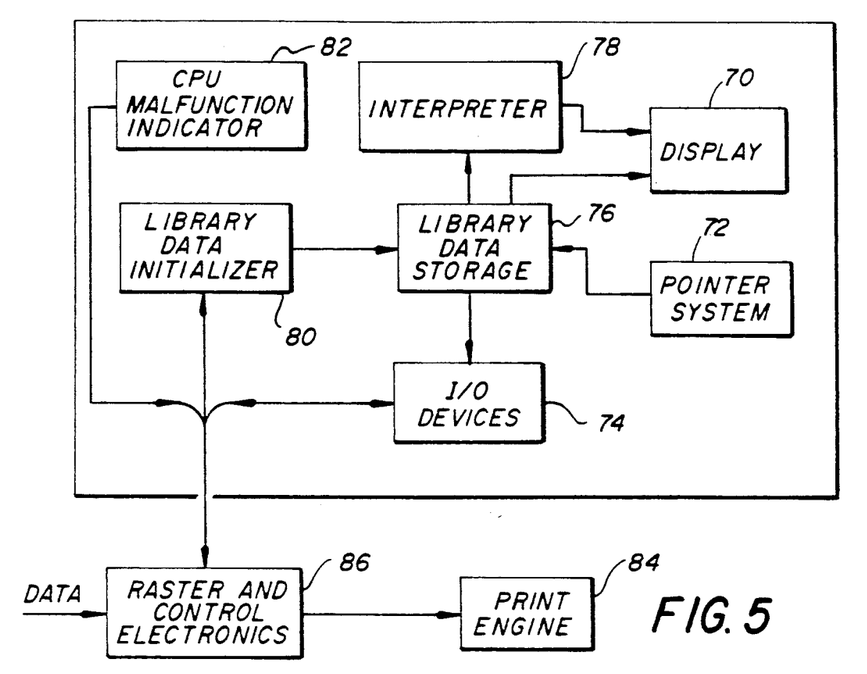
FIG. 5 is a functional diagram of the hardware and software on the status and control panel.

FIG. 5 is a functional diagram of a status and control panel constructed according to this invention. The main functional items or systems contained within the panel 24 are the display device 70, the I/O devices 74, the library data storage 76, the interpreter 78, the library data initializer 80, and the CPU malfunction indicator 82. Other functions, such as the pointer system 72, are used in conjunction with other elements of the panel. The display 70 is comparable to the LCD 30 shown in FIGS. 3 and 4. The pointer system 72 allows for locating, within the library data storage memory 76, the particular message or display data which will be produced by the display 70. Typically, this data is in the form of four display building blocks, which include the icons, text strings, screens, and multiple screen displays. The I/O devices 74 correspond to the input keys and the LED's shown in FIGS. 3 and 4, and may also include other output devices which will be described in relation to FIG. 6. In the case of icon displays, or screen displays which include icons, the interpreter 78 is necessary to interpret or translate the language describing the icons contained in the library data storage 76 before it is supplied to the display 70. To conserve memory, the icons are stored in an icon description language, which is a vectorized language describing the lines which form the icon in a shorthand notation of vectors, thicknesses, positions, etc.

The library data initializer 80 functions to store the display information in the library data storage system 76 at the time the system is first initialized. Since the status and control panel 24 is a universal device and does not contain any data dedicated to a particular machine, the library data needs to be downloaded from the associated device before it can be used during the operation of the device. This is best done at the beginning of the day, or at the time the machine is first powered-up. The remaining functional block, the CPU malfunction indicator 82, provides a signal to the associated device when and if the status and control panel 74 malfunctions. It is independent of the operation of the CPU which maintains normal control over the devices in the control panel. In other words, even if the CPU controlling the panel fails, the malfunction indicator 82 will be able to respond and indicate to the associated device that there is a malfunction in the panel and the associated device can take the appropriate steps. In the system shown in FIG. 5, the associated device includes the print engine 84 and the raster and control electronics 86. The electronics 86 takes the input data to the printer and appropriately processes it into a raster image for transfer to the print engine 84. This same electronics section of the printer can also handle the task of monitoring the parameters of the machine's operation and determining when it is necessary to inform the status control panel 24 that a different display is needed or that the soft-keys be given different functions.

Figure 6:
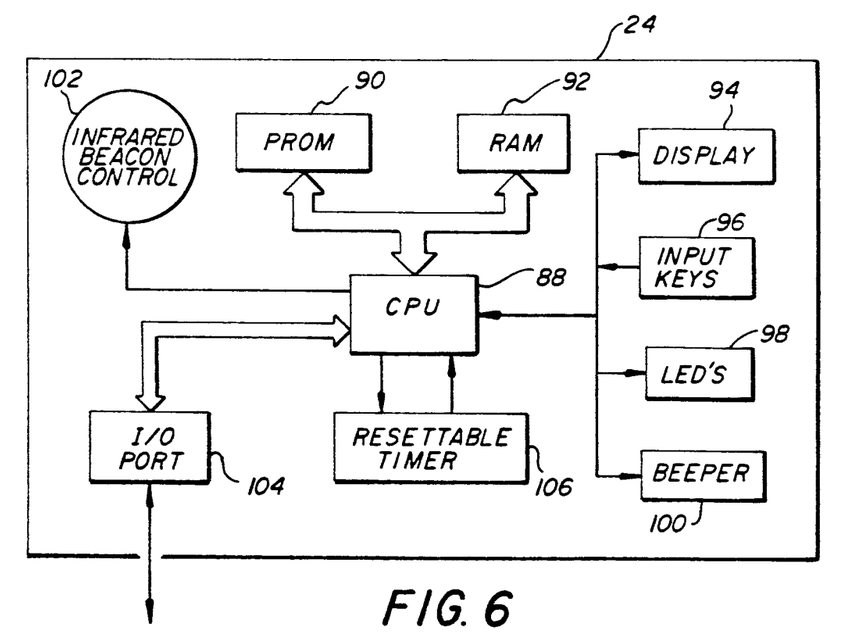
FIG. 6 is a block diagram of the major hardware elements on the status and control panel.

FIG. 6 is a block diagram of the major electrical elements in the status and control panel 24. The central processing unit, or CPU 88, is the main controlling device for the entire panel 24. Its operating program is contained in the PROM 90 and the erasable RAM 92 is used for both program execution and the library storage of the display information. Battery back-up, or other memory retaining techniques or devices, may be used to prevent memory loss from short power interruptions. The input and output devices include the display 94, the input keys 96, the LED's 98, and the beeper or enunciator 100. Devices 94, 96 and 98 have been previously described. The beeper 100 is an audio device located on the control panel 24 which may be activated from the associated apparatus to audibly alert the local operator of a specified condition. The infrared LED beacon control 102 is also controllable by information from the associated device. This beacon control is used to transmit a signal to a central beacon device which will also be activated when the signal is received. This type of system is useful where a number of printers are located in the same environment or room and a single indicator or beacon is needed to alert the operator that a fault has occurred or that servicing of one of the printers is necessary. In addition, the beacon control 102 may be used to signal only a dedicated beacon for that particular printer.

The I/O port 104 is used to communicate with the associated device. In this specific embodiment, the I/O port 104 provides serial communications between the panel 24 and the associated device. The communications between the port 104 and the CPU 88, and between the CPU 88 and the PROM 90 and RAM 92 devices, is by means of a parallel address and data bus, as indicated in FIG. 6. The resettable timer 106 performs the function of the CPU malfunction indicator 82 shown in FIG. 5. Timer 106 is reset repeatedly within certain prescribed or predefined intervals by the CPU 88 when it is operating properly. If reset within this time constraint, no output is applied to the CPU 88. However, if the CPU 88 malfunctions or gets stuck in an endless loop and, as is normally the case when a malfunction occurs with a processor, no changing signal is applied to external devices, the resettable timer 106 is not reset within the prescribed time period. This causes the timer 106 to be activated at the end of the timed interval and a signal is applied to the reset line of the CPU 88. After the CPU is reset and rebooted, a message is passed to the associated device to indicate the malfunction.

Figure 7:
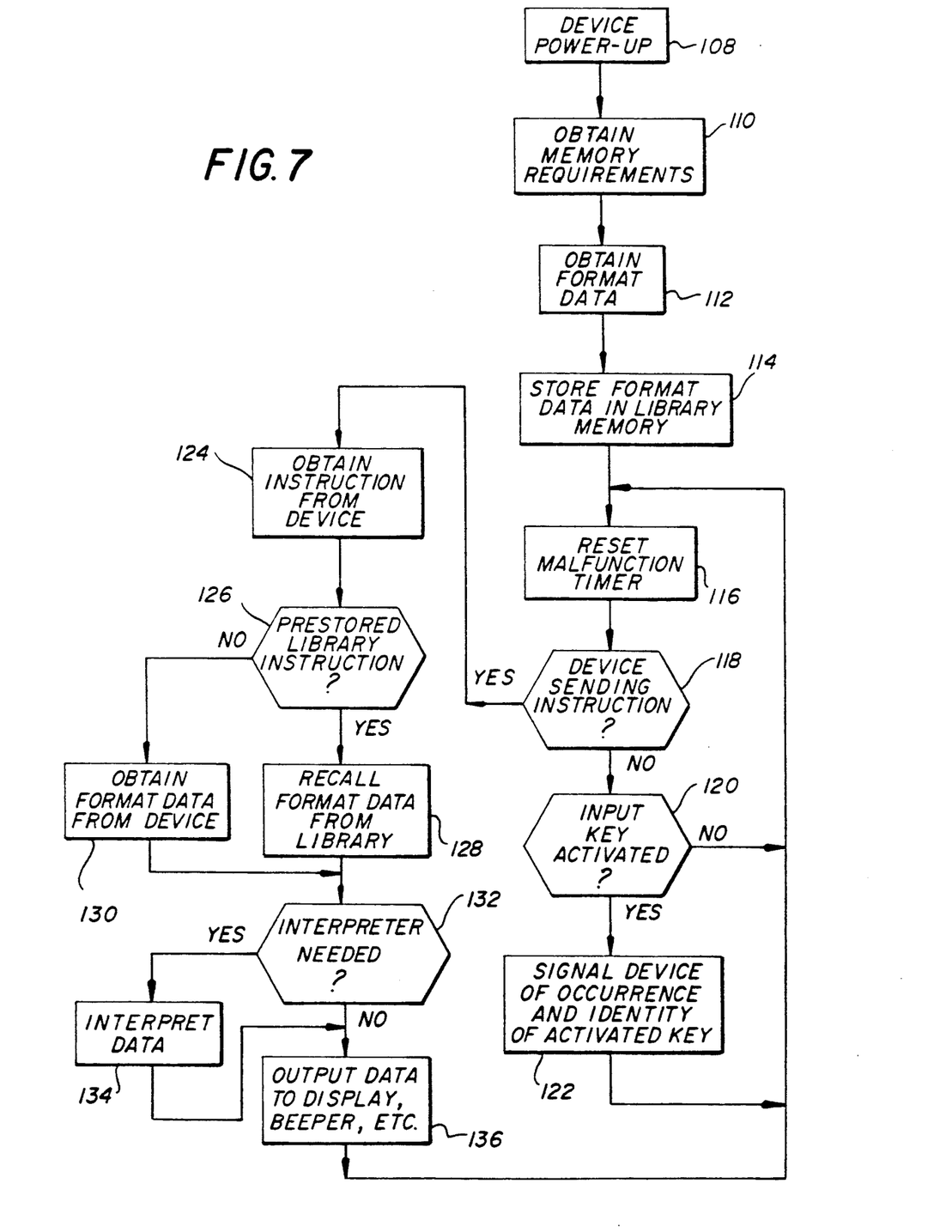
FIG. 7 is a flow chart illustrating the operation of the status and control panel.

FIG. 7 is a flow chart illustrating the operation of the status and control panel. Step 108 indicates that the associated devices is first powered-up. This initiates the operation indicated in FIG. 7 and the status and control panel 24 first obtains the memory requirements for storing the display data in the library, as indicated in step 110. To economically allocate the memory 92 (FIG. 6), the space needed to store each of the different types of display formats must be known ahead of time. In other words, the associated device tells the panel 24 that it needs a certain amount of memory to store each of the four types of display formats; text strings, icons, screens, and multiple screens. Once the size requirements are known, the actual data corresponding to the four types of displays is transferred or downloaded according to step 112. This data is then stored in the library memory according to step 114. Thus, at this point in the operation of the control panel 24, the library contains all of the information or data needed to construct the displays when requested by the associated device.

After initialization, the process flow begins at step 116 which resets the malfunction timer. As can be seen from FIG. 7, the malfunction timer is reset periodically throughout the operation of the panel by looping back to this point in the flow diagram. If the flow through to diagram is halted for some reason, such as a CPU malfunction, the timer would not be reset, and the malfunction would be indicated. Step 118 determines whether the associated device is sending an instruction to the panel to tell it to change the display. If no such instruction is being sent, process flow continues to step 120 where the input devices on the control panel are monitored to see if they are being activated, or being pushed by the operator. If they are not, then process flow is directed back to the beginning of step 116 and continues this loop until either a key is activated or the associated device sends an instruction signal. If a key is pushed, process flow is directed to step 122 which causes the panel to issue a signal to the associated device that a key has been pushed and the identity of the key which has been pushed. Of course, the associated device takes whatever action it has been programmed to do in response to the particular key being pushed. After sending the activated key signal, the process flow returns again to step 116.

If the device is sending an instruction to change the display, or to activate the beeper, the LED's, or the infrared beacon, process flow is diverted to step 124. In this step, the instruction is received from the associated device and a determination is made, in step 126, whether the instruction has been preloaded in the library, such as would be the case with normally used icons, text strings, screens, and multiple screens. If this is the case, process flow continues to step 128 where the display format is recalled from the library. If the instruction from the associated device indicates that data has not been prestored in the library, which would occur when infrequently used displays or signals are being requested by the associated device, process flow is directed to step 130. In step 130, the control panel obtains additional data from the associated device in the way of data or information which defines the display or output to occur. In step 132, it is determined whether the interpreter on the panel 24 is needed. The interpreter would be needed primarily when the format data is to produce an icon on the display, or to produce a screen on the display which contains an icon. Since the icon is in a vector notation or icon description language, step 134 would be necessary to interpret the data and to convert it into a raster form necessary for display on the LCD. It is not necessary to interpret text strings since the LCD has dedicated circuitry thereon which does the conversion process from an ASCII input of characters to the required dot-matrix format necessary to display the characters on the LCD. The final step 136 outputs the data to the display, beeper, beacon, or LED to properly communicate with the local user.

Figures 8, 9, 10:
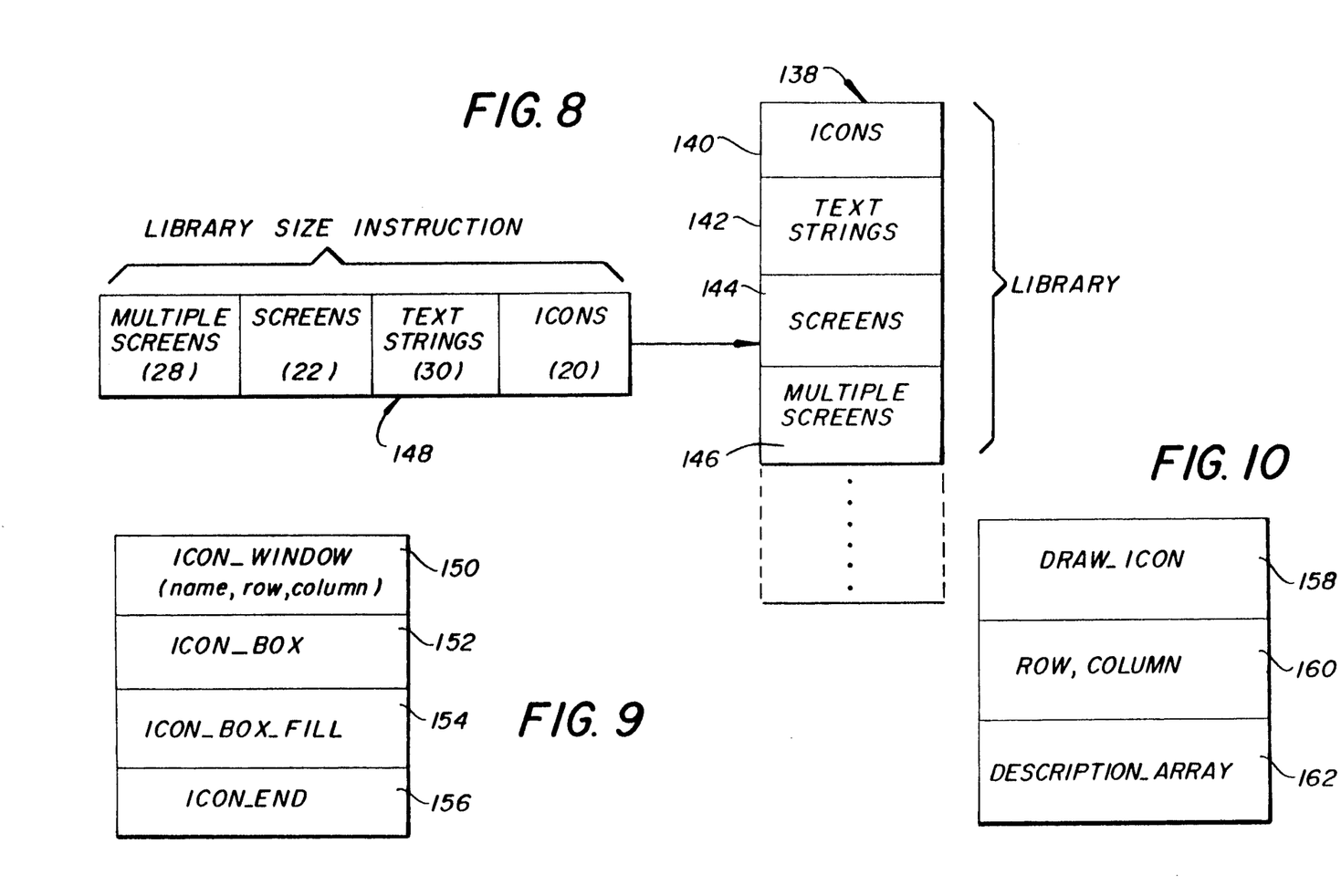
FIG. 8 is a diagram showing the arrangement and sizing of the library menu in the status and control panel.
FIG. 9 is a diagram illustrating a typical description array stored in the library memory.
FIG. 10 is a diagram illustrating the format of an instruction for displaying an icon on the status and control panel.

FIG. 8 is a diagram showing the arrangement and sizing of the library memory according to this invention. The library 138, which is provided in volatile RAM memory such as RAM 92 in FIG. 6, includes space for storing data defining icons 140, text strings 142, screens 144, and multiple screens 146. Normally, each of these four different display formats would occupy a different amount of space in the library 138. Each format type would also include a plurality of separate and distinct displays or formats within each category. The size of the library 138 is determined upon initialization of the device by an instruction from the associated device, as indicated by the instruction 148. In this specific example, there are 20 different icons to be stored in the library 138, 30 different text strings, 22 different screens, and 28 different multiple screen displays to be stored in the library 138. Thus, when an instruction signal from the associated device has to display a particular multiple screen identified to be one of the stored 28 multiple screen sequences, a pointer is controlled by the instruction to select that particular multiple screen set from the library 138. Since the multiple screens can include some of the separate screens included in format types 144, the actual creation of the specified multiple screen set may use some information stored for the screens. By a similar analysis, certain text strings and/or icons already stored in format types 140 and 142 may be used by some of the screens contained in the selected multiple screen set.

FIG. 9 is a diagram illustrating a typical description array stored in the library memory. This particular description array would be stored in section 140 of the library 138 shown in FIG. 8. It represents one particular icon of the 20 icons stored in section 140. This multiple byte drawing command can be interpreted by the panel and arrive at the dot-matrix pixel array in the form necessary to represent the desired image. The illustrated command contains the parameters which define a filled box icon of a particular size. The first parameter, ICON_WINDOW 150, gives a name to the icon for later identification and also indicates the size of the window containing the icon by the number of rows and columns specified in this first parameter. The next parameter, ICON_BOX 152, indicates the type of icon to be drawn and, in this case, it is a rectangular box. The next parameter, ICON_BOX_FILL 154, indicates that the interior portions of the box are to be filled, or on the LCD display, the pixels will be observed by the user as being dark. The last parameter, ICON_END 156, tells the processing system on the control pane 24 that all of the data to define the icon has been set forth and that program execution can be transferred.

If the description stream is an included image, such as would be the case where the icon was a part of a screen display, the ICON_END parameter or command simply returns processing to the parent image, or screen. If the current stream is the route image stream, this command causes the bit-map image to be transferred to the LCD for display. The ICON WINDOW command must be the first command entry in the icon description stream. It defines the name used to reference the following icon and the number of pixel rows and columns the icon will occupy. Examples of other icon description language commands include ICON_ARC, ICON_CIRCLE, ICON_LINE, ICON_DOT, and ICON REVERSE, all of which should be self-explanatory to those skilled in the art.

FIG. 10 is a diagram illustrating the format for an instruction for displaying an icon on the status and control panel. This type of instruction is transferred from the associated device to the panel when the panel display or other outputs are to be changed. According to FIG. 10, the DRAW_ICON parameter 158 indicates that an icon previously stored in the library is to be drawn by the control panel on the LCD. The position on the LCD of the icon is specified by the ROW, COLUMN parameter 160. The identity of the icon to be drawn is specified by the DESCRIPTION_ARRAY parameter 162, which is the last parameter included in the instruction shown in FIG. 10. Thus, the predefined information or description array stored in the library 138 is drawn or displayed on the LCD at the position indicated in the instruction parameter 160.

The unique combination of hardware arrangement and software operation permits the status and control panel of this invention to be universally used with various types of associated devices. By arranging the components in the fashion indicated, preloading the dedicated information to the control panel at the beginning of the day of operation of the machine, and using other display and speed enhancing techniques, the status and control panel of this invention provides new and useful functions not realizable with conventional operator panels.

It is emphasized that numerous changes may be made in the above-described system without departing from the teachings of the invention. It is intended that all of the matter contained in the foregoing description, or shown in the accompanying drawings, shall be interpreted as illustrative rather than limiting.

We claim as our invention:

1. A method of operation for a status and control panel suitable for use with an associated copier or printer, said panel having a display for outputting status information to the local user and selective inputs which the use may activate to input information to the device, said method including the steps of:

receiving downloaded data from the associated device at the time the device is powered-up, said data defining standard display formats which may be displayed by the panel;

storing the received data into known locations in an erasable memory; monitoring for instruction signals from the associated device, said instruction signals indicating the display format which is to be displayed and, in the case of text strings and icons, also indicate the position on the display where the previously stored data is to be displayed;

searching the memory, when an instruction signal has been received, for the display data corresponding to the indicated format; and outputting the data to produce the indicated format.

2. The operating method of claim 1 wherein at least four standard display formats are downloaded to the status and control panel, with formats for icons, text strings, screens, and multiple screens being included in the downloaded data.

3. The operating method of claim 2 wherein the downloaded data contains vectorized data in the icon descriptions and ASCII data in the text string descriptions.

4. The operating method of claim 2 wherein the downloaded data contains at least two parameters, with one parameter identifying the type of data and with another parameter specifying the actual data.

5. The operating method of claim 1 wherein information about the size of the memory necessary to store the downloaded data is downloaded to the status and control panel before the data is downloaded for storage in memory.

6. The operating method of claim 1 including the steps of:

monitoring for activation of the selective inputs; and when an input is detected, signaling the associated device about the occurrence and identity of the input.

7. A method of operation for a status and control panel suitable for use with an associated copier or printer, said panel having a display for outputting status information to the local user and selective inputs which the user may activate to input information to the device, said method including the steps of:

receiving downloaded data containing vectorized data for defining icons and ASCII data for defining text strings, and wherein the instruction signals indicate, in the case of text strings and icons, the position on the display where the previously stored data is to be displayed from the associated device at the time the device is powered-up, said data defining standard display formats which may be displayed by the panel;

storing the received data in memory for future use;

monitoring for instruction signals from the associated device, said instruction signals indicating the display format which is to be displayed;

retrieving the previously stored data correonding to the format indicated in the instruction signal; and 8. The operating method of claim 7 including the steps of:

monitoring for activation of the selective inputs; and when an input is detected, signaling the associated device about the occurrence and identity of the input.

9. A method of operation for a universal status and control panel suitable for use with an associated copier or printer, said panel having a single dot-matrix display for outputting pictorial and alphanumeric status information to the local user and having selective input keys which the user may activate to input types of information to the device, with the information types being indicated on the display at positions corresponding to particular keys, said method including the steps of:

receiving downloaded format data from the associated device at the time the device is powered-up, said data defining standard display formats which may be displayed by the panel, said standard formats including icons, text strings, screens, and multiple screens, with said data being in vectorized form for the icons and in ASCII form for the text strings;

receiving, before the format data is received, downloaded library size information from the associated device about the size of memory necessary to store each format contained in the downloaded format data;

allocating a number of locations in a memory device of the status and control panel to each of the display formats based upon the received library size information;

storing the received format data in the allocated memory locations for future use;

monitoring for instruction signals from the associated device, said instruction signals indicating the display format which is to be displayed and, in the case of icon and text string formats, the position on the display where the previously stored data is to be displayed;

retrieving the previously stored format data corresponding to the format indicated in the instruction signal;

outputting data to the display to produce the indicated format;

monitoring for activation of the input keys;

signaling, when an input key is activated, the associated device about the occurrence and identity of the input key; and resetting, repeatedly, a timer device within a predetermined period of time, said timer device being constructed to signal the associated device if not reset within the predetermined time, thereby indicating a malfunction on the status and control panel.

10. A status and control panel suitable for use with an associated copier or printer, said panel comprising:

a dot-matrix display for outputting status information to the local user;

selective input keys which the user may activate to input types of information to the device, with the information types being indicated on the display at positions corresponding to particular keys;

an erasable memory system;

means for storing in the memory system format data received from the associated device at the time the device is powered-up, said data defining standard display formats which may be displayed by the panel, said standard formats including icons, text strings, screens, and multiple screens, with said data being in vectorized form for the icons and ASCII form for the text strings;

means for receiving, before the format data is received, downloaded library size information from the associated device about the size of the memory system which must be allocated to store each format contained in the downloaded format data;

means for monitoring for instruction signals from the associated device, said instruction signals indicating the display format which is to be displayed and, in the case of icon and text string formats, the position on the display where the previously stored data is to be displayed;

means for retrieving the previously stored format data corresponding to the format indicated in the instruction signal;

means for outputting data to the display to produce the indicated format;

means for monitoring for activation of the input keys;

means for signaling, when an input key is activated, the associated device about the occurrence and identity of the input key;

a resettable timing device, said timing device being constructed to send a signal to the associated device of a panel malfunction if not repeatedly reset within a predetermined time;

visual and audible indicators which may be activated by the associated apparatus to convey status information top the local user; and a transmitting device suitable for signaling a remote indicator to indicate that the associated device has malfunctioned.

* * * * *

UNITED STATES PATENT AND TRADEMARK OFFICE
CERTIFICATE OF CORRECTION

PATENT NO. : 5,121,113
DATED : June 9, 1992
INVENTOR(S) : Gregory J. Kedge, et al It is certified that error appears in the above-indentified patent and that said Letters Patent is hereby corrected as shown below:

Claim 7, Col. 12, Line 2    After "and" insert --outputting the data to produce the indicated format.--

Signed and Sealed this

Third Day of August, 1993

Attest:

MICHAEL K. KIRK

*Attesting Officer*    Acting Commissioner of Patents and Trademarks